United States Patent
Remla et al.

(10) Patent No.: US 11,681,844 B1
(45) Date of Patent: Jun. 20, 2023

(54) CONFIGURABLE TESTING OF SEMICONDUCTOR DEVICES

(71) Applicant: XILINX, INC., San Jose, CA (US)

(72) Inventors: Riyas Noorudeen Remla, Singapore (SG); Chee Chong Chan, Singapore (SG)

(73) Assignee: XILINX, INC., San Jose, CA (US)

( * ) Notice: Subject to any disclaimer, the term of this patent is extended or adjusted under 35 U.S.C. 154(b) by 81 days.

(21) Appl. No.: 17/216,508

(22) Filed: Mar. 29, 2021

(51) Int. Cl.
*G06F 30/333* (2020.01)
*G06F 30/31* (2020.01)
*G06F 119/02* (2020.01)

(52) U.S. Cl.
CPC ............ *G06F 30/333* (2020.01); *G06F 30/31* (2020.01); *G06F 2119/02* (2020.01)

(58) Field of Classification Search
CPC ..... G06F 30/31; G06F 30/333; G06F 2119/02
See application file for complete search history.

*Primary Examiner* — Jack Chiang
*Assistant Examiner* — Aric Lin
(74) *Attorney, Agent, or Firm* — Patterson + Sheridan, LLP

(57) ABSTRACT

A semiconductor device comprises a design under test (DUT), a testing interface, pattern generation circuitry, and pattern checker circuitry. The pattern generation circuitry is connected to the DUT and the testing interface. The pattern generation circuitry is configured to generate a test data sequence and control data based on configuration data received from the testing interface, and communicate the test data sequence and the control data to the DUT. The pattern checker circuitry is connected to the DUT and the testing interface. The pattern checker circuitry is configured to generate a comparison test sequence based on the configuration data received from the testing interface, receive resultant test data sequence and output control data from the DUT, and generate a first error signal based on a comparison of the resultant test data sequence and the comparison test sequence and a comparison of the output control data and the configuration data.

20 Claims, 9 Drawing Sheets

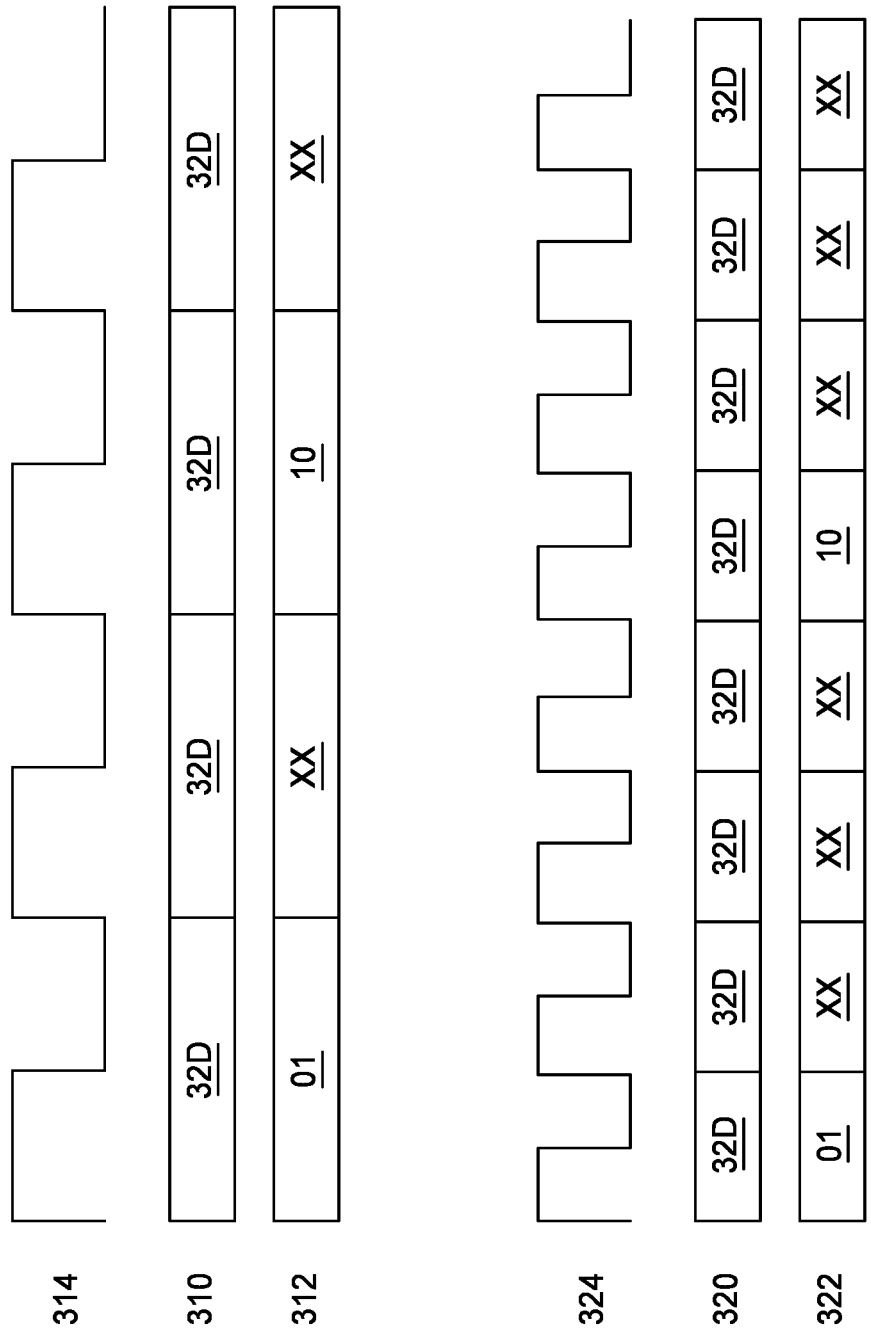

CONFIGURABLE TESTING OF SEMICONDUCTOR DEVICES

TECHNICAL FIELD

Examples of the present disclosure generally relate to detecting errors within semiconductor devices and debugging the semiconductor devices.

BACKGROUND

In many instances, functional testing of semiconductor devices occurs after stackup integration of the dies has been completed. For example, the semiconductor devices are tested after the completion of 3D integration. However, waiting for the completion of the stackup integration slows down the testing process as the testing process cannot be completed until the completion of the stackup integration process.

Periodic random binary sequences (PRBS) testing methods may be used to detect errors within semiconductor devices. However, current PRBS testing methods are not compatible with semiconductor device interfaces that utilize control (e.g., header) bits along with PRBS testing data. Current PRBS testing methods do not have a way to communicate and toggle control bits with the PRBS testing data and are unable to test functional processes of semiconductor devices. Accordingly, PRBS testing methods are not currently used to test semiconductor devices that utilize control bits.

In various instances, chip-level communication pins of a semiconductor device are not available for the communication of test data. In such instances, the test data cannot be communicated to and/or resultant test data cannot be received from the semiconductor device. Accordingly, there is a need for an improved system and/or method to communicate testing data to and from a semiconductor device without relying on communication pins which may be unavailable.

Thus, there is a need for an improved testing method that can be completed before dies are integrated within a stackup, is able to toggle control bits of a semiconductor device, and/or utilizes a reduced number of chip-level communication pins.

SUMMARY

Examples described herein provide for a detecting errors within semiconductor devices and debugging the semiconductor devices. For example, a testing interface provides test data to a sequence generation circuitry and sequence checker circuitry within a semiconductor device. The testing interface communicates control data and/or configuration data to the sequence generation circuitry and sequence checker circuitry. The sequence generation circuitry generates test control data and test sequence data from the control data and/or configuration data. The sequence generation circuitry may be periodic random binary sequence generation circuitry that generates a periodic random binary test sequence. The test control data and test sequence data is transmitted to a design under test (DUT) of a semiconductor device. The sequence checker circuitry receives output data from the DUT and compares the output data to a comparison sequence data and output control data to determine if errors exist within the DUT. The comparison sequence data may be a periodic random binary sequence. The sequence checker circuitry generates the comparison sequence data from configuration data provided by the testing interface. Employing sequence generation circuitry, sequence checker circuitry, and the testing interface allows for functional testing semiconductor devices to be tested before integrating the semiconductor devices into a stackup. Further, through the use of the sequence generation circuitry, the sequence checker circuitry, and the testing interface, functional testing of semiconductor devices may be completed when a limited number are pins on the semiconductor device are available for testing.

In one example, a semiconductor device comprises a design under test (DUT), a testing interface, pattern generation circuitry, and pattern checker circuitry. The pattern generation circuitry is connected to the DUT and the testing interface. The pattern generation circuitry is configured to generate a test data sequence and control data based on configuration data received from the testing interface, and communicate the test data sequence and the control data to the DUT. The pattern checker circuitry is connected to the DUT and the testing interface. The pattern checker circuitry is configured to generate a comparison test sequence based on the configuration data received from the testing interface, and receive resultant test data sequence and output control data from the DUT. The pattern checker circuitry is further configured to generate a first error signal based on a comparison of the resultant test data sequence and the comparison test sequence, and a comparison of the output control data and the configuration data.

In one example, a method for testing a semiconductor device comprises generating, by pattern generation circuitry, a test data sequence and control data based on configuration data provided by a testing interface. The method further comprises communicating the test data sequence and the control data to a design under test (DUT). Further, the method comprises generating, by pattern checker circuitry, a comparison test sequence based on the configuration data provided by the testing interface, and receiving a resultant test data sequence and output control data from the DUT. The method further comprises generating, by the pattern checker circuitry, a first error signal based on a comparison of the resultant test data sequence and the comparison test sequence, and a comparison of the output control data to the configuration data.

In one example, a testing system comprises a semiconductor device. The semiconductor device comprises a design under test (DUT), a testing interface configured to connect to a testing device, pattern generation circuitry, and pattern checker circuitry. The pattern generation circuitry is connected to the DUT and the testing interface. The pattern generation circuitry is configured to generate a test data sequence and control data based on configuration data received from the testing interface, and communicate the test data sequence and the control data to the DUT. The pattern checker circuitry is connected to the DUT and the testing interface. The pattern checker circuitry is configured to generate a comparison test sequence based on the configuration data received from the testing interface, and receive resultant test data sequence and output control data from the DUT. The pattern checker circuitry is further configured to generate an error signal based on a comparison of the resultant test data sequence and the comparison test sequence, and a comparison of the output control data and the configuration data. The testing interface is configured to communicate the error signal to the testing device and the testing device is configured to detect one or more errors within the DUT based on the error signal.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3B is a diagram depicting example test data sequences according to some examples.

To facilitate understanding, identical reference numerals have been used, where possible, to designate identical elements that are common to the figures. It is contemplated that elements of one example may be beneficially incorporated in other examples.

DETAILED DESCRIPTION

Examples described in the following describe a semiconductor testing and debugging system that is able to detect errors within and debug various different types of semiconductor device designs. For example, a testing interface (e.g., a Joint Test Action Group (JTAG) interface or internal JTAG (iJTAG) interface) is used to provide test data (e.g., configuration data) to and receive test data from semiconductor device. The semiconductor device may be a system on chip (SoC) or other type of integrated circuit (IC). Further, the semiconductor device may be a field-programmable gate array (FPGA) semiconductor device or an application specific integrated circuit (ASIC). The testing interface provides test data to a sequence generation circuitry and sequence checker circuitry within a semiconductor device to debug and/or detect errors within the semiconductor device. The testing interface communicates control data and/or configuration data to the sequence generation circuitry and sequence checker circuitry. The sequence generation circuitry utilizes the control data and/or configuration to generate test data (e.g., a test data sequence and control data). The sequence checker circuitry utilizes the control data and/or configuration data to generate comparison data (e.g., output control data and comparison sequence data). The comparison data is used to detect errors and debug the semiconductor device. Incorporating the sequence generation circuitry, the sequence checker circuitry, and the testing interface within a semiconductor device allows for the functional testing of the semiconductor devices before the semiconductor device is integrated within a stackup and/or when there is a limited number of available pins on the semiconductor device.

Figure 1:
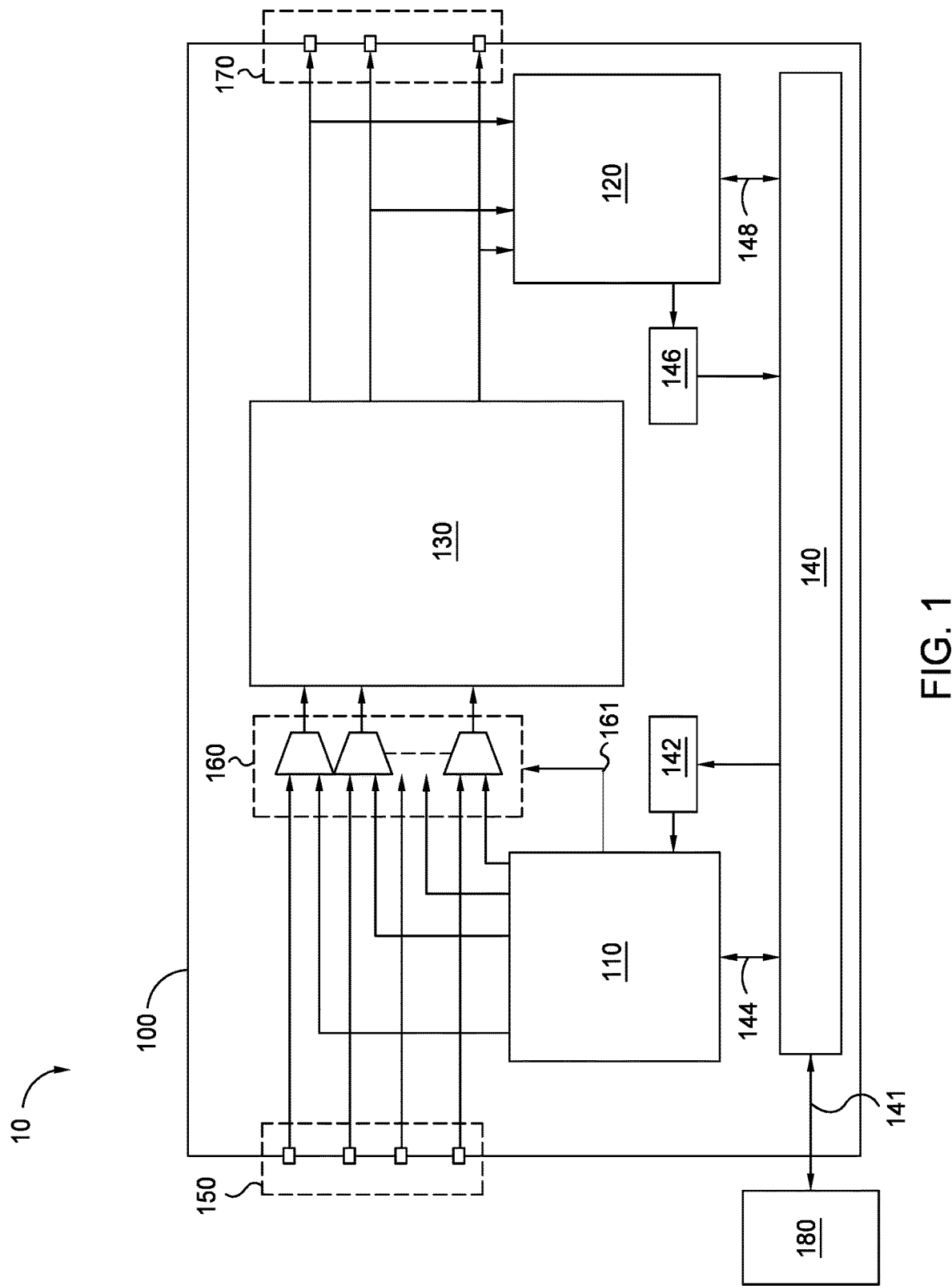
FIG. 1 is a block diagram depicting an example semiconductor device according to some examples.

FIG. 1 illustrates a semiconductor device 100, according to one or more embodiments. The semiconductor device 100 is a die including an IC. The semiconductor device 100 is a known good die. A known good die is free from faults. A known good die passes one or more tests utilized to detect faults (e.g., errors). For example, a known good die is determined, through the use of one or more tests, to be fault (e.g., error) free. In one example, the semiconductor device 100 is an SoC. Further, the semiconductor device 100 is part of an FPGA or an ASIC. In examples where the semiconductor device 100 is part of an FPGA, the semiconductor device 100 is an intellectual property (IP) block (core) that is integrated into an FPGA fabric (e.g., the internal structure of an FPGA). Multiple semiconductor devices 100 may be integrated into a FPGA fabric through a 3D connection (e.g., 3D integration). In such an example, each of the semiconductor devices 100 may be referred to a chiplet that has been configured to function with one or more other semiconductor devices (or chiplets). In examples that include a 3D FPGA stackup, two or more of the semiconductor devices are in different technology nodes (e.g., process) and/or two or more of the semiconductor devices are in the same technology node. Further, in examples that include a 3D FPGA stackup, one or more of the semiconductor devices is in a technology node that is different or the same as the technology node of the FPGA fabric. The semiconductor device 100 may be in a higher or lower technology node than the technology node of the FPGA fabric. In one example, the semiconductor device 100 is a transceiver in a 16 nm technology node and the FPGA is a 7 nm technology node.

The semiconductor device 100 includes pattern generation circuitry 110, pattern checker circuitry 120, a design under test (DUT) 130, and a testing interface 140. Further, the semiconductor device 100 includes communication pins 150, selection circuitry 160, and communication pins 170. The semiconductor device 100 is connected to a testing device 180. The testing device 180 and the semiconductor device 100 are part of the testing system 10.

The DUT 130 is a controller of the semiconductor device 100. The DUT 130 may be a transmitter, receiver, transceiver, or another type of controller.

The communication pins 150 and the pattern generation circuitry 110 are electrically connected to the DUT 130 via the selection circuitry 160. In one example, the selection circuitry 160 is external to the pattern generation circuitry 110. In another example, the selection circuitry 160 is included within the pattern generation circuitry 110. The selection circuitry 160 selectively connects the communication pins 150 or outputs of the pattern generation circuitry 110 to respective inputs of the DUT 130. The DUT 130 is further connected to communication pins 170 and the pattern checker circuitry 120. For example, outputs of the DUT 130 are connected to communication pins 170 and inputs of the pattern checker circuitry 120. The selection circuitry 160 is controlled via the control signal 161 provided by the pattern generation circuitry 110 or another element of the semiconductor device 100. The output of the selection circuitry 160 is defined by the control signal 161. For example, each MUX of the selection circuitry 160 receives the control signal 161, and the control signal 161 defines the output each MUX.

The testing interface 140 is connected to the pattern generation circuitry 110 and the pattern checker circuitry 120. The testing interface 140 is electrically connected to the pattern generation circuitry 110 via the test-data register (TDR) 142 and connection 144. Further, the testing interface 140 is electrically connected to the target state register (TSR) 146 and connection 148. The testing interface 140 is connected to the testing device 180 external to the semiconductor device 100 via communication lines 141.

The TDR 142 receives and stores test control information from the testing interface 140. The TDR 142 communicates the test control information to the pattern generation circuitry 110. The TDR 142 is one or more bits wide. For example, the TDR 142 is two or more bits wide. Further the TDR 142 may be extended to a number of bits greater than 2 based on the usage and/or configuration of the pattern generation circuitry 110.

The TSR 146 is connected to the output of the pattern checker circuitry 120 and stores the test status information provided by the pattern checker circuitry 120. The TSR 146 is multiple bits wide. For example, the TSR 146 is two or more bits wide. Further the TSR 146 may be extended to greater than two based on the usage and/or configuration of the pattern checker circuitry 120.

The testing device 180 is external to the semiconductor device 100 and includes one or more computer systems. The testing device 180 generates test data and transmits the test data to the testing interface 140. Further, the testing device 180 receives output test data from the testing interface 140 and processes the test data to detect one or more faults (e.g., errors or bugs) and location of the faults within the semiconductor device 100.

Figure 2:
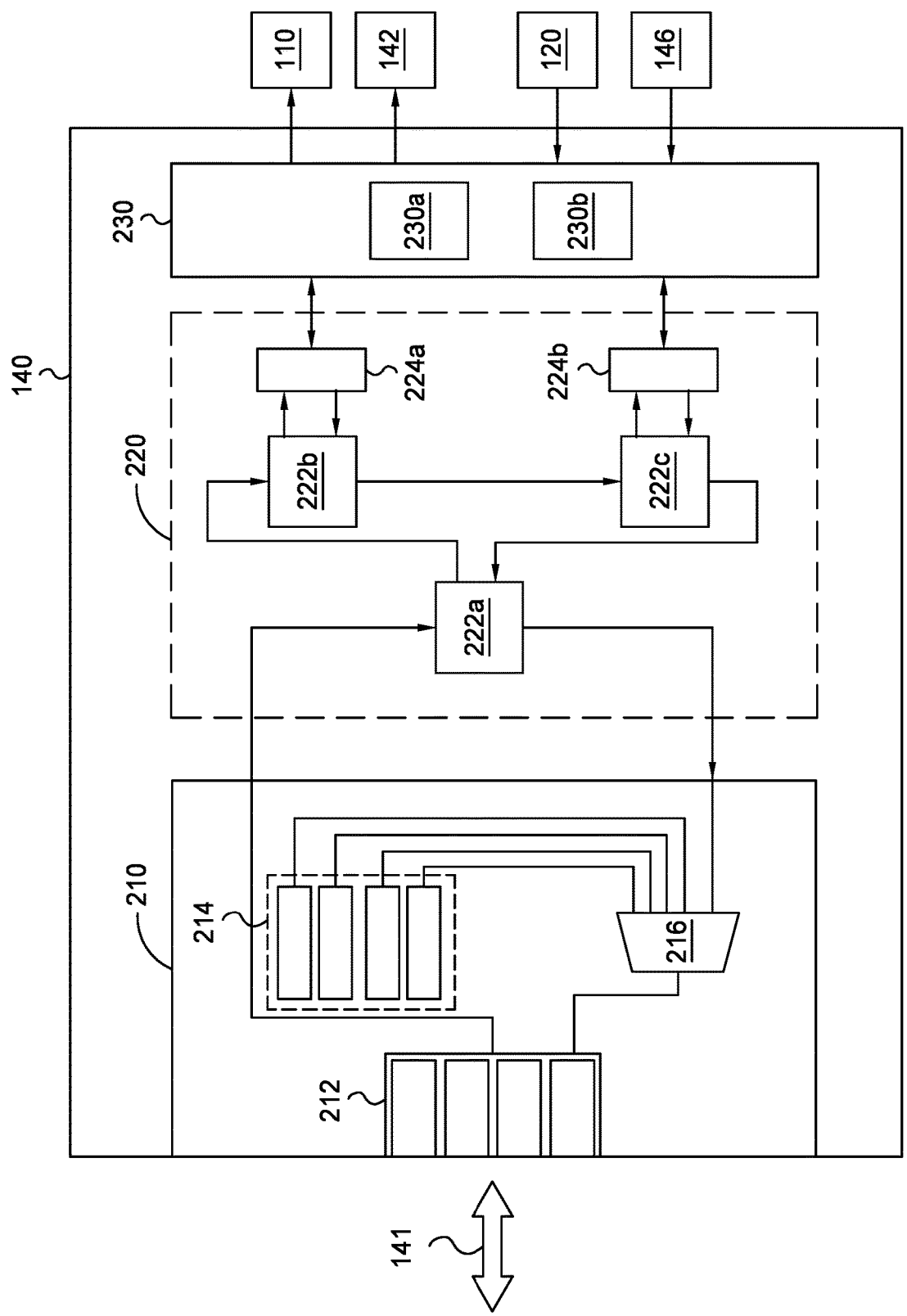
FIG. 2 illustrates a block diagram depicting an example testing interface according to some examples.

FIG. 2 is a schematic block diagram of a portion of the testing interface 140, according to one or more embodiments. As illustrated in FIG. 2, the testing interface 140 is a JTAG interface or an internal JTAG (iJTAG) interface. The testing interface 140 includes a test access port (TAP) controller 210, a scan-path network 220, and instruments 230.

The tap controller 210 includes communication pins 212. One or more of the communication pins 212 receive test signals (e.g., test data) and control signals from the testing device 180. Further, output test signals, e.g., resultant test data received from the DUT 130, are output via one or more of the communication pins 212 to the testing device 180. For example, the communication pins 212 receive test data and/or control signals from one or more of the communication lines 141, and output resultant test signals to the testing device 180 via one or more of the communication lines 141.

The communication pins 212 include a test mode select (TMS) pin that receives TMS signals. The TMS signal is a voltage that controls the functionality of the testing interface 140. By varying the voltage of the TMS signal, the functionality of the testing interface 140 is altered. Altering the functionality of the testing interface 140, changes a state and functionality of the testing interface 140.

The communication pins 212 includes a test clock (TCK) pin that receives a TCK signal from the testing device 180 via the communication lines 141. The TCK signal is the clock control signal of the tap controller 210. For example, the TCK signal controls the operating speed of the tap controller 210.

The communication pins 212 includes a test data in (TDI) pin. The TDI pin receives test data from the testing device 180 via the communication lines 141. The test data is a series of 1s and 0s. The test data may be selected based on the TMS signal and the TCK signal.

The communication pins 212 include a test data out (TDO) pin. The TDO pin outputs resultant test data to the testing device 180 via the communication lines 141. The resultant test data is a series of 1s and 0s.

The communication pins 212 may additionally include a test reset (TRST) pin. The TRST pin receives a TRST signal that resets the testing interface 140 to a known good state. For example, the testing device 180 communicates a control signal to the TRST pin via the communication lines 141 to reset the testing interface 140. The TRST pin is optional, and in some examples, may be omitted.

The TAP controller 210 further includes registers 214. The registers 214 include a boundary scan register (BSR). The BSR includes a number of boundary scan cells that stores and communicates the test data to and from the communication pins 212.

The registers 214 further include a BYPASS (BYP) register. The BYP register passes information from the TDI pin to the TDO pin. For example, the data within the BYP register selects one or more devices for testing and/or instructs one or more devices to be bypassed (e.g., skipped) from testing.

The registers 214 further an IDCODES register. The IDCODES register contains the identification (ID) code and revision number for the semiconductor device 100. The ID code and revision number links the semiconductor device 100 to a boundary scan description language (BSDL) file containing details of the boundary scan configuration for the semiconductor device 100.

The registers 214 further include an instruction register (IR). The IR contains an instruction for the TAP controller 210. For example, the instruction may be a BYPASS instruction instructing the TAP controller 210 to bypass (e.g., skip) one or more devices for test.

The TAP controller 210 further includes a MUX 216. The MUX 216 selects from the output of the registers 214 and the test data output from the DUT of the semiconductor device 100. The output of the MUX 216 is connected to the TDO pin and the signal output by the MUX 216 is communicated to the TDO pin.

The scan-path network 220 includes segment insertion bits (SIBs) 222 and test data registers (TDRs) 224. The SIBs 222a, 222b, and 222c connect the output of the tap controller 210 with the TDRs 224a and 224b via one or more scan paths. Enabling different ones of the SIBs 222 actives different scan paths within the scan-path network 220. For example, enabling the SIBs 222a and 222b activates the scan path between the SIB 222a, the SIB 222b, and the TDR 224a. Further, enabling the SIBs 222a, 222b, and 222c activates the scan path between the SIB 222a, the SIB 222b, the SIB 222c, and the TDR 224b.

The TDRs 224 are connected to the instruments 230. The instruments 230 include instruments 230a and 230b. In other examples, the instruments include more than or less than two instruments. The TDRs 224 output test data and/or receive test data from the instruments 230. Further, activating a scan path within the scan-path network 220 activates the instrument 230 on the activated scan path. Disabling different ones of the SIBs 222 deactivates corresponding different scan paths within the scan-path network 220. Deactivating a scan path within the scan-path network 220 deactivates the instruments 230 on the deactivated scan path. In one or more examples, the instrument 230 on a deactivated scan path is inaccessible.

The instruments 230a and 230b may be memory built-in self-test (MBIST) circuitries. For example, the instrument 230a and/or 230b provide a done signal indicating that testing of a DUT is complete and/or a fail signal indicating that testing of a DUT has failed to a corresponding TDR 224.

A TDR 224 outputs a reset signal to a corresponding instrument 230a and 230b to reset the state of the instrument 230a, 230b. Further, a TDR 224 outputs a run signal to a corresponding instrument 230a, 230b instructing the instrument 230a, 230b to run (e.g., initialize) a test.

The instruments 230 are connected to the pattern generation circuitry 110, the pattern checker circuitry 120, the TDR 142, and the TSR 146. The instruments 230 communicate test data and/or control signals (e.g., clock signals, test data, initialization signals, and/or reset signals, among others) to the pattern generation circuitry 110 and/or the TDR 142. Additionally, or alternatively, the instruments 230 receive test data from the pattern checker circuitry 120 and/or the TSR 146.

Figure 3A:
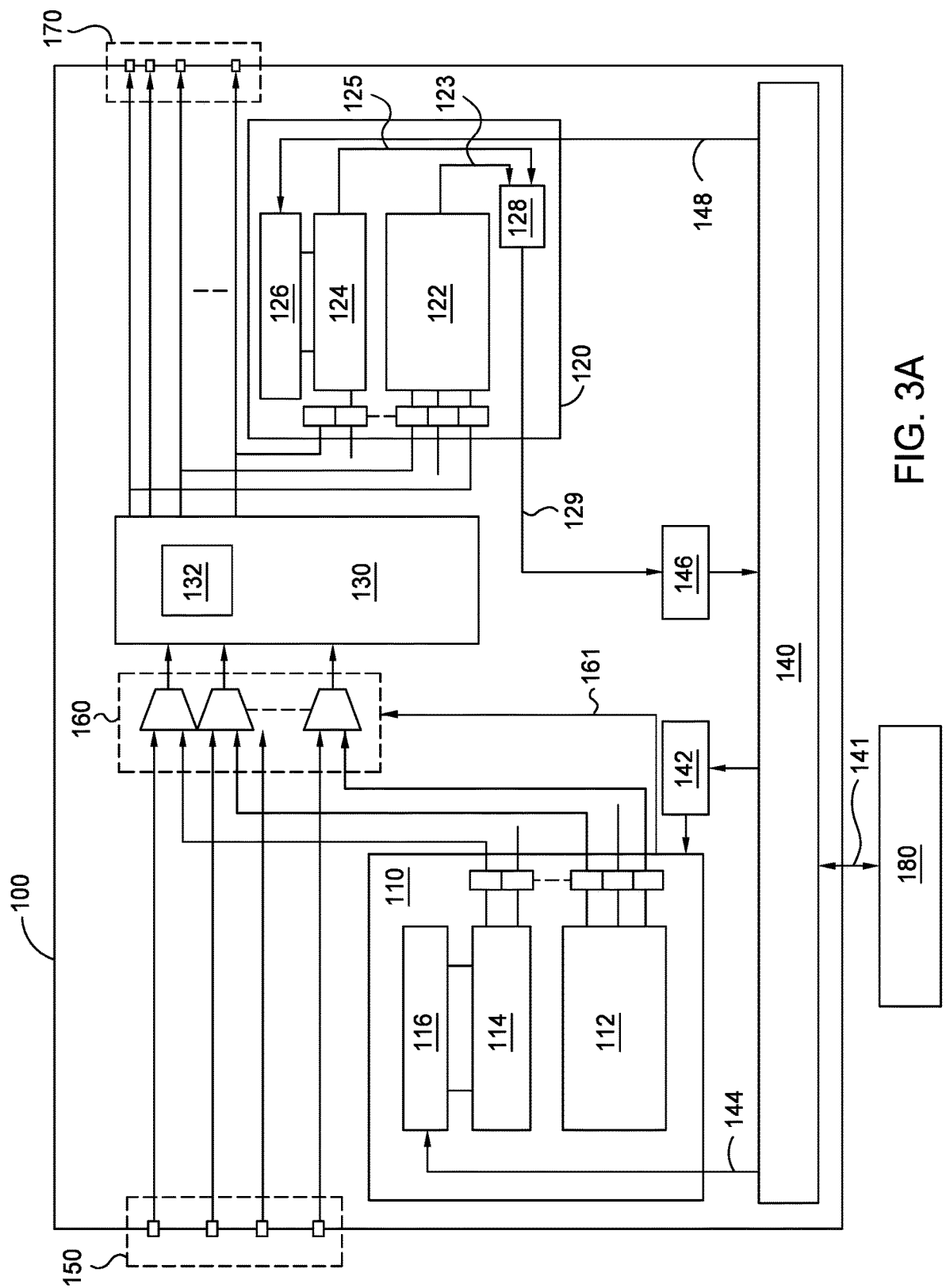
FIG. 3A is a block diagram depicting an example semiconductor device according to some examples.

FIG. 3A illustrates the semiconductor device 100, according to one or more embodiments. As is illustrated in FIG. 3A, the pattern generation circuitry 110 includes test data generation circuitry 112, control data generation circuitry 114, and configuration memory 116.

The test data generation circuitry 112 may be referred to as periodic random binary sequence (PRBS) generation circuitry. The test data generation circuitry 112 generates one or more test data sequences based on test data (e.g., configuration data) receive from the testing interface 140. A test data sequence is a binary sequence or a pseudorandom number. The test data sequence may be referred to as a periodic random binary sequence. The test data generation circuitry 112 generates the test data sequences based on configuration data (e.g., configuration patterns and/or control signals) provided by the testing interface 140. The test data generation circuitry 112 outputs the test data sequence to the DUT 130. The test data generation circuitry 112 is connected to the DUT 130 via the selection circuitry 160. In one example, the test data generation circuitry 112 has multiple connections with the DUT 130. In such embodiments, the test data generation circuitry 112 outputs one or more test data sequences. In other examples, the test data generation circuitry 112 has a single connection with the DUT 130. In such embodiments, the test data generation circuitry 112 outputs a single test data sequence.

FIG. 3B illustrates example test data sequences 310 and 320. The test data sequence 310 corresponds to a 32 bit data path and the test data sequence 320 corresponds to a 16 bit data path. The length of the test data sequence 310 and/or 320 corresponds to the size of the data path (e.g., a number of bits of the data path) and the size of the header (e.g., a number of bits of the header) to be tested. The test data sequence 310 is transmitted based on header information 312 and the signal 314. In the example of FIG. 3B, the test data sequence 310 is transmitted during when the header information 312 is either "01" or "10" (e.g., cycles "01" or "10") and not during cycles "XX" of the header information 312. Accordingly, as issued in FIG. 3B, the test data sequence 310 is transmitted during alternating cycles as each a cycle of "01" is separated from a cycle of "10" by a cycle of "XX". However, in other examples, other arrangements may be used. In one example, the number of cycles of the header information 312 during which the test data sequence is transmitted is 8. Alternatively, the number of cycles during which data is transmitted may be less than or greater than 8 (e.g., 4, 6, 10, or 12, etc.).

The test data sequence 320 is transmitted based on header information 322 and the signal 324. In the example of FIG. 3B, the test data sequence 320 is transmitted when the header information 322 is "01" and "10" (e.g., cycles "01" and "10") and not during cycles "XX" of the header information 322. As is illustrated in FIG. 3B, the test data sequence 320 is transmitted during alternating cycles as each a cycle of "01" is separated from a cycle of "10" by a cycle of "XX". However, in other examples, other arrangements may be used. The number of cycles during which a test data sequence is transmitted is or less than or greater than 8. For example, for a 16 data path with a 2 bit header the number of cycles is 4 or 6.

As illustrated in FIG. 3B, a cycle "01" of header information (e.g., the header information 312 or 322) is followed by a cycle "10" of header information. In another example, the cycles of the header information may be in an order of "00", "01", "10", and "11". In one example, the cycles of the header information may be in an order of "10", "01", "10", and "01". In other examples, other orders of cycles may be used.

The test data generation circuitry 112 transmits the test sequence data during one or more cycles. In one example, for size of the data path between the test data generation circuitry 112 and the DUT 130 is smaller than the size (e.g., the number of bits) of the test sequence data. In such an example, the test sequence data is transmitted over more than one cycle. In one example, the a first portion of the test sequence data is transmitted to the DUT 130 from the test data generation circuitry 112 during a first cycle and an "M" portion of the test sequence data is transmitted to the DUT 130 from the test data circuitry 112 during an "M" cycle. In such an example, M is an integer greater than 1.

In one example, the test data generation circuitry 112 repeats the transmission of the pattern of the test data sequence every N cycles of a clock signal (e.g., the clock signal of the testing interface 140 of an internal clock signal of the semiconductor device). N is an integer greater than 1. N is the number of cycles of test sequence data that can be driven on the DUT 130 before the test data is repeated.

In one example, the clock signal is generated by clock control circuitry within the pattern generation circuitry 110. The clock control circuitry is phase locked-loop (PLL) of the pattern generation circuitry 110.

The test data generation circuitry 112 includes a liner feedback shift register that generates the test data sequence. Further, the test data generation circuitry 112 includes a transmitter that transmits the test data sequence to the DUT 130.

The test data sequence is a sequence of symbols (e.g., bits) that is generated based on a clock signal and/or a configuration pattern provided by the testing interface 140. The clock signal may be an internal clock signal of the semiconductor device 100, the pattern generation circuitry 110, or provided by the testing interface 140. The sequence of symbols may include pseudo random symbols. Transitions of the pattern comparison signal are synchronous with transitions of the clock signal. In one example, the clock signal is provided by a source internal to the semiconductor device 100. In one example, the clock signal is generated by clock control circuitry of the pattern generation circuitry 110. Further, in one example, a clock signal utilized for the data path of the DUT 130 is proved by a source internal to the semiconductor device 100 and the clock or clocks used for a control path or other non-data paths are provided by the pattern generation circuitry 110.

The control data generation circuitry 114 generates test control data (e.g., test header data or information) that is output to the DUT. The test control data (e.g., the test control data 420 of FIG. 4) provides one or more of an enable signal, write control signal, clock signal, and a data signal, among others, to the DUT. For example, the test control data identifies the element or elements within the DUT for test, and enables test of the identified element or elements via a write control signal, clock signal, and a data signal. For example, with reference to FIG. 3A, the test control data identifies and enables the memory elements 132 of the DUT 130 for test. The memory elements 132 includes a built in self-test (GIST) logic. The test control data allows for the memory elements 132 and/or the functional interface (e.g., functional elements) of the DUT 130 to be tested. For example, test control data may select the memory elements 132 for test. Additionally, or alternatively, the test control data selects the functional interface (e.g., data transmission, data receipt, data processing, and/or other functional interfaces) of the DUT 130 for testing. Further, the test control data may vary from cycle to cycle to enable different parts of the testing process (e.g., enabling the elements under test, writing to the elements under test, and/or providing a clock signal, etc.).

The configuration memory 116 receives a configuration pattern from the testing interface 140. The configuration memory 116 outputs the configuration pattern to the control data generation circuitry 114. The control data generation circuitry 114 generates the test control data based on the configuration pattern. In one example, the configuration memory 116 is omitted and the configuration pattern is loaded into the control data generation circuitry 114 from the testing interface 140.

Figure 4:
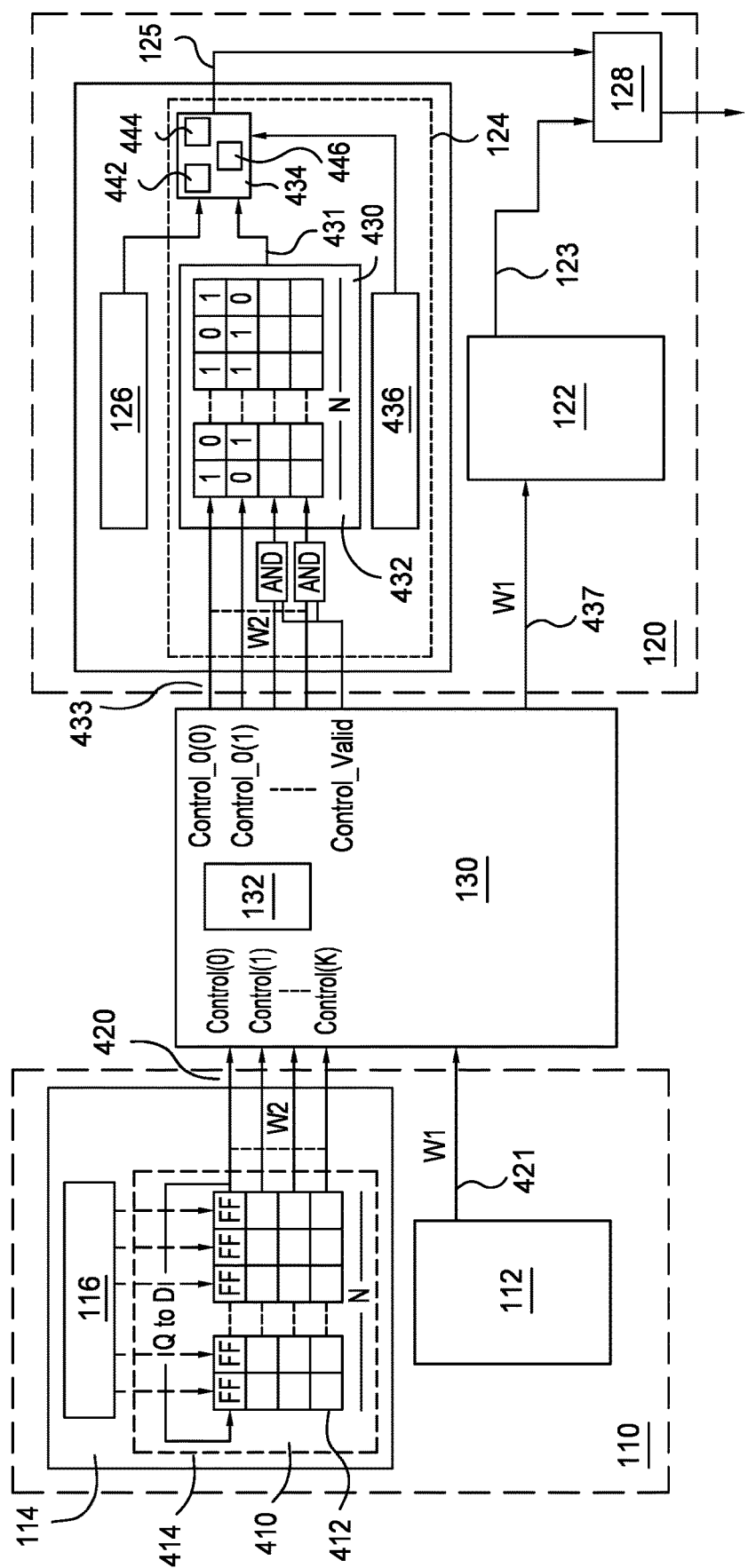
FIG. 4 is a block diagram depicting an example semiconductor device according to some examples.

As illustrated by FIG. 4, the control data generation circuitry 114 includes shift register circuitry 410 that outputs the test control data 420. The shift register circuitry 410 outputs the test control data 420 to one or more inputs of the DUT 130. The test control data 420 includes multiple bits that set the inputs of the DUT 130 to a desired state. In one example, the inputs of the DUT 130 are control inputs (e.g., header inputs), and the control data 420 has a value of a 0 or 1 (or other values) that is loaded into the control inputs of the DUT 130 to set the state of the control input. The control inputs may be control pins corresponding to the control signal of the protocols supported by the DUT 130. For example, the control inputs may correspond to header signals. In other example, the control inputs correspond to other control signals. The control signal provided to the control inputs control a particular data rate and have different values when the data rate is changed (e.g., changed from 20 Gbps to 10 Gbps). Further, one or more of the control inputs may be used to enable or disable circuitry within the DUT 130.

In one example, the DUT 130 further includes static inputs. The static inputs are driven by one or more flip flops within the control data generation circuitry 114. The flip flops are external to the flip flops 412. In another example, the static inputs are driven by an element or elements external to the control data generation circuitry 114 and within the semiconductor device 100. Further, in one example, the static inputs are driven by the testing interface 140. The values of the static inputs remain at the set state until the functional mode of the DUT 130 is changed.

The shift register circuitry 410 includes flip flops 412. The flip flops 412 may be disposed in multiple rows. Each row of the flip flops 412 has a common number of flip flops 412. Further, the number of rows of the flip flops 412 corresponds to a number of control inputs (e.g., header inputs) of the DUT 130.

In each row of the flip flops 412, the flip flops are connected such that for sequential flip flops, the output of one flip flop is connected to the input of a sequential flip flop. In one example, the flip flops are D flip flops and, for sequential flip flops, the Q output pin of a first flip flop is connected to a D input of a sequential flip flop. The flip flops 412 implement a linear feedback shift register (LFSR) with feedback taps based on the configuration pattern of the configuration memory 116. For example, the output pin of a last flip flop in a row is connected to the input of the first flip flop of the row. The configuration pattern may be a primitive polynomial. The configuration pattern corresponds to expected values that will be used to control the DUT 130 during test.

The size of the configuration memory 116 corresponds to the number or rows of flip flops 412 and the number of cycles during which a test data sequence is transmitted. In one example, the size of the configuration memory 116 is equal to or greater than the number or rows of flip flops 412 multiplied by the number of cycles during which a test data sequence is transmitted. In one example, the configuration memory 116 may be omitted and the testing interface 140 communicates directly with the flip flops 412 via memory mapped access within the testing interface 140.

The flip flops 412 may further be disposed in multiple columns. Each column of the flip flops 412 receives a different bit from the configuration memory 116. In one example, the configuration pattern is loaded into the first flip flop of a row and shifted through each of the flip flops of that row until the configuration pattern is output to a corresponding input of the DUT 130 and fed back to the first flip flop of the row.

The shift register circuitry 410 generates W2 rows of control data. The number of flip flops in each row of the shift register circuitry 410 corresponds to the number of cycles of the test data sequence. For example, the number of flip flops in each row is N. Accordingly, the control data generated by the shift register is synchronized with the test sequence data. The total number of flip flops 412 within the shift register circuitry 410 is N×W2.

The test data sequence 421 output by the test data generation circuitry 112 has a width of W1. The total data traffic width W of the test data transmitted to the DUT 130 is W1+W2. The total data traffic includes each of row of the control data and the test data sequence. The test data generation circuitry 112 is programmable to support various different widths W1. Further, the control data generation circuitry 114 is programmable to support various different width W2 and cycles N. The test data generation circuitry 112 and the control data generation circuitry 114 are programmed via the testing interface 140.

The test control data 420 configures the DUT 130 to select which elements of DUT 130 are tested. For example, the test control data 420 may select the memory elements 132 for testing. Alternatively, or additionally, the test control data 420 selects the functionality (e.g., data transmission, data receipt, and/or other functionality) of the DUT 130 for testing.

In one example, the control data generation circuitry 114 first outputs an enable control signal to the DUT 130, followed by a write enable control signal. The write enable control signal is followed by a read enable control signal provided by the control data checker circuitry 124. Further, the control data checker circuitry 124 sets a ready signal to a high value to enable the read control signal and to allow data to be read out from the DUT 130 and into the control data checker circuitry 124. The ready signal has a high value at least one cycle after the data is written into the DUT 130.

With further reference to FIG. 3A, the sequence checker circuitry 122 may be referred to as PRBS data checker circuitry. The sequence checker circuitry 122 receives resultant test data 437 from the DUT 130. The sequence checker circuitry 122 compares the resultant test data 437 to a test comparison sequence to determine whether or not errors are present within the resultant test data. The sequence checker circuitry 122 generates the test comparison sequence. The test data sequence is generated based on test data (e.g., configuration data) provided by testing interface 140. The test comparison sequence corresponds to the test data sequence. In one example, the test comparison sequence is the same as the test data sequence. In another example, the test comparison sequence is a delayed version of the test data sequence. The delay is based on the delay of the DUT 130 such that the test comparison sequence is synchronized with the test data sequences. The test comparison sequence may be generated based on a clock signal. The clock signal may be generated based on clock control circuitry of the sequence checker circuitry 122, Errors within the test comparison sequence corresponds to a difference between the resultant test data and the test data sequence. The sequence checker circuitry 122 outputs an error signal 123 to the comparison circuitry 128. The error signal 123 is indicative as to whether or not the resultant test data 437 comprises one or more errors. For example, the output signal 123 has a first value when the resultant test data 437 is not determined to have any errors and a second value when the resultant test data 437 is determined to have one or more errors. The first value differs from the second value. For example, the first value may be a voltage value that is greater than or less than a voltage value of the second value.

The pattern checker circuitry 120 includes sequence checker circuitry 122, control data checker circuitry 124, configuration memory 126, and comparison circuitry 128. The configuration memory 126 stores the configuration pattern (e.g., configuration data) received from the testing interface 140. The configuration pattern stored within the configuration memory 126 is the same as the configuration pattern of the configuration memory 116.

With further reference to FIG. 4, the control data checker circuitry 124 includes a buffer 430 and error identification circuitry 434. The control data checker circuitry 124 further includes trigger count circuitry 436.

The buffer 430 includes flip flops 432. The flip flops 432 are disposed in rows and columns. The number of rows of the flip flops 432 corresponds to a number of rows of the flip flops 412. Further, the number of columns of the flip flops 432 corresponds to the number of columns of the flip flops 412 and the number of cycles.

The buffer 430 receives output control data 433 from outputs of the DUT 130. The error identification circuitry 434 receives an output control data signal 431 that is based on the output control data 433 from the buffer 430 and compares the output control data signal 431 data to a configuration pattern received from the configuration memory 126. The error identification circuitry 434 determines whether or not if there are errors within the output control data 433 based on the comparison of the output control data signal 431 with the configuration pattern. The error identification circuitry 434 generates bit error counts for sampling positions within the output control data signal 431. When the sequence of the configuration pattern is determined to not match the output control data signal 431, the output control data 433 is determined to have errors. When the sequence of the configuration pattern is determined match the output control data signal 431, the output control data 433 is determined to be free from errors. The error identification circuitry 434 generates an error signal 125. The error signal 125 is indicative of whether or not there are errors within the output control data 433. For example, the error signal 125 has a first value based on a determination that the control data is free from errors and a second value based on a determination that the control data had one or more errors. The error signal 125 is output to the comparison circuitry 128. The error signal 125 is provided (e.g., communicated to the comparison circuitry 128.

In one example, the buffer 430 includes one or more AND logic blocks disposed between the DUT 130 and two or more respective rows of the buffer 430. For example, the AND logic blocks receive a first signal of the output control data 433 via a first input and a second signal of the output control data 433 via second input. The second signal of the output control data 433 corresponds to a ready or valid signal that allows corresponding row or rows of the buffer 430 to be loaded when the second signal has a high value. When the second signal of the output control data 422 is low, a value of 0 is loaded into the corresponding row of the buffer 430. The second signal of the output control data 422 may have a low value based on the test control data 420 having random data. In one example, the test data sequence is transmitted over two or more cycles, the control data corresponding to the second cycle (or later cycle) may be ignored.

Further, when testing the memory elements 132, the second signal of the output control data 433 corresponds to a ready signal of the test control data 420. When the ready signal of the test control data 420 is high, the second signal of the output control data 433 is high, and a corresponding row or rows of the buffer 430 is loaded with data from the memory elements 132. Further, when the ready signal of the test control data 420 is low, the second signal of the output control data 422 is low, and a corresponding row or rows of the buffer 430 is not loaded with data from the memory elements 132.

The buffer 430 generates the output control data signal 431 based on the output control data 433. The output control data 433 corresponds to the test control data 420 provided by the shift register circuitry 410. The buffer 430 generates a check sequence of pseudo-random binary symbols and outputs the check sequence as the output control data signal 431.

The buffer 430 includes flip flops 432 that are configured similar to that of the flip flops 412 of the shift register circuitry 410. The configuration pattern may be a primitive polynomial. The flip flops 432 are configured different than the LFSR implemented by the flip flops 412. In one example, once the flip flops 432 of the shift register circuitry 410 are filled, a trigger signal (or control signal) is asserted, and loading data from the DUT 130 into the flip flops 432 is stopped.

The configuration memory 126 is connected to the error identification circuitry 434. The size of the configuration memory 126 corresponds to the number or rows of flip flops 432 and the number of cycles during which a test data sequence is transmitted. In one example, the size of the configuration memory 126 is equal to or greater than the number or rows of flip flops 432 multiplied by the number of cycles during which a test data sequence is transmitted. Further, the size of the configuration memory 116 is the same as the size of the configuration memory 126. Alternatively, the size of the configuration memory 116 is bigger or smaller than the size of the configuration memory 126

The error identification circuitry 434 includes a receiver circuitry 442, a detector circuitry 446, and/or an error count circuitry 444. The receiver circuitry 442 receives the output control data signal 431 from the buffer 430. The receiver circuitry 442 provides the resultant test data to the error count circuitry 444. The receiver circuitry 442 processes the output control data signal 431 before the output control data signal 431 is provided to the error count circuitry 444. The processed output control data signal 431 is delayed such that the output control data signal 431 is synchronized with the delay of the DUT 130 and/or the output control data 422.

The error count circuitry 444 receives the processed output control data signal 431 and compares the processed output control data signal 431 to the configuration pattern from the configuration memory 126. The error count circuitry 444 generates an error signal indicating the detected error bit based on a detection of one or more error bits in the processed output control data signal 431. The error count circuitry 444 provides an error signal to a look-up table that generates a pass signal. The pass signal is generated using a shift register. The look-up table functions as an AND gate to ensure that the error signal is output when the start indication signal (e.g., trigger) is provided by the trigger count circuitry 436. For example, the error signal is output when the start indication signal has a high value. The output pass signal of the look-up table is synchronized with the shift register to generate a synchronized pass signal.

The trigger count circuitry 436 generates a start indication signal with a high value based on a trigger value. For example, the trigger value has a value of N. In such embodiments, the start indication signal is generated with a high value after N cycles of a clock signal. The output control data is loaded into the buffer 430 for N cycles. Loading of the data is stopped based on the start indication signal having a high value. The start indication signal has a high value until the error identification circuitry 434 outputs the error signal 125. Accordingly, the buffer 430 does not load data from when the start indication signal has a high value and until the error identification circuitry 434 outputs the error signal 125.

The detector circuitry 446 compares the sequence of symbols in the output control data signal 431 with a check-sequence to determine whether a valid sequence is found within the output control data signal 431 and if errors (e.g., faults) are found within the output control data signal 431. A sequence may be determined to be valid per cycle or when an associated identifying signal (e.g., datavalid or header valid signal) has a high value. In one example, for a valid sequence, any identified mismatch between the sequence and the check-sequence signifies that the DUT 130 has one or more faults (errors). The detector circuitry 446 generates an indication signal indicating a valid sequence of sampled symbols within the output control data signal 431 based on the determination that the output control data signal 431 contains a valid sequence of samples symbols. The detector circuitry 446 generates a pass signal based on the determination that the output control data signal 431 contains a valid sequence of sampled symbols. The pass signal indicates when the symbols of the output control data signal 431 are correct. Further, the detector circuitry 446 generates a fail signal based on the determination that the output control data signal 431 does not contain a valid sequence of sampled symbols.

The error identification circuitry 434 outputs an error signal indicative of the output control data 433 being free from errors based on a receipt of a pass signal from the detector circuitry 446 and the error signal indicative of no errors provided by the error count circuitry 444. The error identification circuitry 434 outputs an error signal indicative of the output control data 433 having one or more errors based on a receipt of a fail signal from the detector circuitry 446 and/or the error signal indicative of errors provided by the error count circuitry 444.

The sequence checker circuitry 122 and control data checker circuitry 124 are programmable via the testing interface 140 to supports various widths W1, W2 and cycles N.

With further reference to FIG. 3A, the comparison circuitry 128 outputs the error signal 129 based on a comparison of the error signal 123 and the error signal 125. The error signal 129 is output to the TSR 146 and then to the testing interface 140. The error signal 129 has a first value when the error signal 123 and the error signal 125 are free from errors. The first value is indicative that the error signal 123 and the error signal 125 are free from errors. The error signal 129 has a second value when the error signal 123 and/or the error signal 125 include one or more errors. The second value is indicative that the error signal 123 and/or the error signal 125 include one or more errors. The first value differs from the second value. For example, the first value is greater than or less than the second value.

Figure 5:
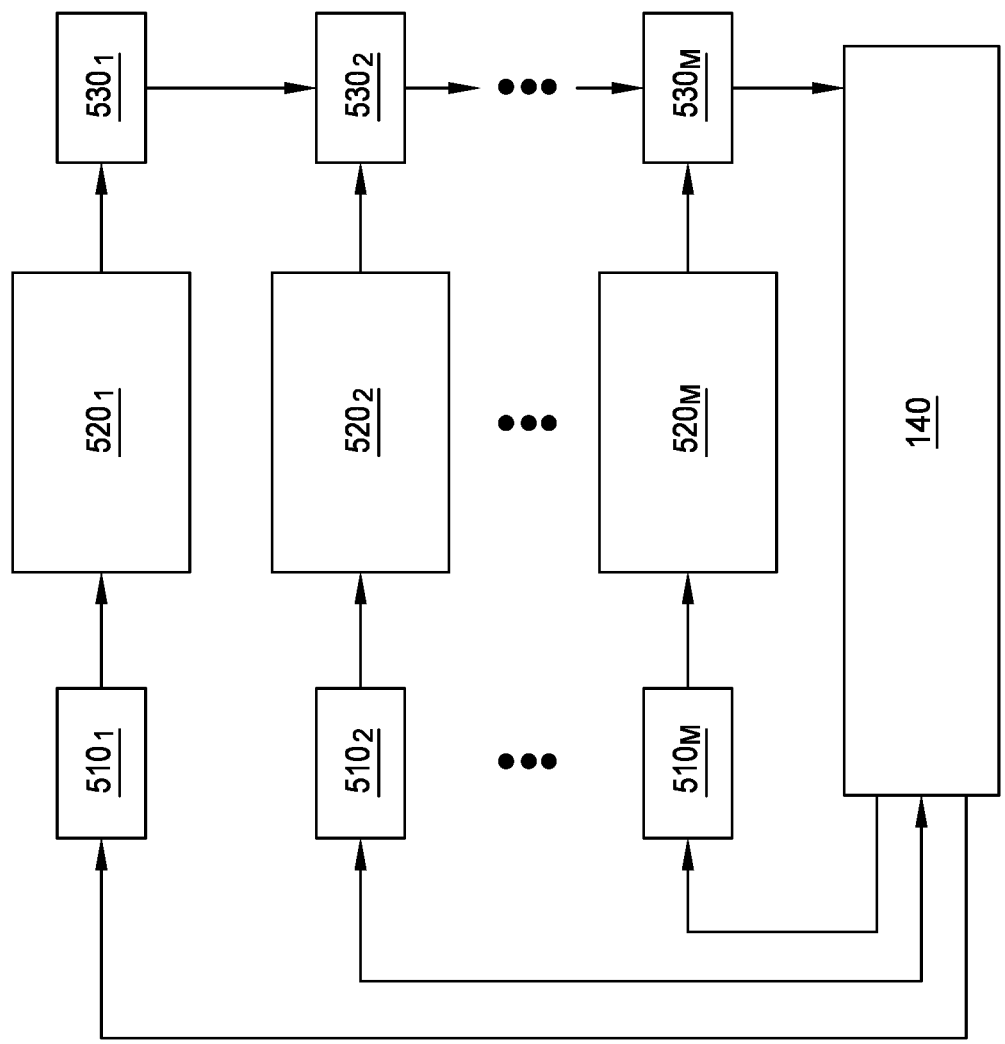
FIG. 5 is a block diagram depicting an example semiconductor device according to some examples.

FIG. 5 illustrates a semiconductor device 500, according to one or more embodiments. The semiconductor device 500 includes DUTs 520. For example, the semiconductor device 500 includes DUT $520_1$, DUT $520_2$, and DUT $520_M$. M is an integer of 3 or more. The DUTs 520 may any combination of controllers (e.g., transmitters, receivers, or data processors, among other). For example, two or more of the DUTs 520 are the same type of controllers. Further, one or more of the DUTs 520 has is a type of controller different than the type of each other DUT 520. The semiconductor device 500 further includes pattern generation circuitries 510 and pattern checker circuitries 530. Each DUT 520 is coupled to a respective pattern generation circuitry 510 and a respective pattern checker circuitry 530. For example, the DUT $520_1$ is connected to pattern generation circuitry $510_1$ and pattern checker circuitry $530_1$. The DUT $520_2$ is connected to pattern generation circuitry $510_2$ and pattern checker circuitry $530_2$. The DUT $520_M$ is connected to pattern generation circuitry $510_M$ and pattern checker circuitry $530_M$.

Each of the pattern generation circuitries 510 is configured similar to that of the pattern generation circuitry 110 of FIGS. 1, 3, and 4. For example, each of the pattern generation circuitries 510 generates a test data sequence and control data for each respective DUT 520. One or more of the pattern generation circuitries 510 receives common test data from the testing interface 140 that is used to generate the test data sequences and control data. Additionally, or alternatively, one or more of the pattern generation circuitries 510 receives test data that is different than the test data received by another one or more of the pattern generation circuitries 510. Accordingly, one or more of the pattern generation circuitries 510 generates control data and/or test data sequences different than another one or more of the pattern generation circuitries 510. The test data, the test data sequences, and/or the control data may correspond to the type of circuit design for each DUT.

Each of the pattern checker circuitries 530 is configured similar to that of the pattern checker circuitry 120 of FIGS. 1, 3, and 4. For example, each of the pattern checker circuitries 530 receives and processes resulting test data sequence and resulting control data received from each respective DUT 520.

The pattern checker circuitries 530 are serially connected to each other forming a daisy chain of pattern checker circuitries 530. For example, the output of the pattern checker circuitry $530_1$ is connected to the input of the pattern checker circuitry $530_2$. The output of the pattern checker circuitry $530_2$ is connected to the input of the pattern checker circuitry $530_M$. Each pattern checker circuitry $530_1$-$530_{M-1}$ outputs an error signal to a subsequent pattern checker circuitry 530. Each pattern checker circuitries $530_2$-$530_{M-1}$ receives the output signal from a previous pattern checker circuitry 530 and additionally outputs the output signal of the previous pattern checker circuitry or circuitries 530 to a following pattern checker circuitry 530. The pattern checker circuitry $530_M$ outputs a corresponding output signal and the output signal of each other pattern checker circuitry 530 to the testing interface 140. The testing interface 140 outputs the output signals to the testing device 180.

In one example, the pattern generation circuitry 110 is shared with multiple DUTs. For example, the pattern generation circuitry 110 may be shared with multiple DUTs of the same type and/or configuration. The DUTs have an identical circuit design. The DUTs may have a common number of channels and/or transceivers. In examples where the pattern generation circuitry 110 is shared with multiple DUTs, additional pipelines are added before each DUT. Accordingly, each DUT may be tested in sequence. In an example that includes multiple unique DUTs, the pattern generation circuitry 110 may be utilized to test the unique DUTs. In such an example, the DUTs are tested concurrently. Using a common pattern generation circuitry 110 to test multiple DUTs saves area cost within the corresponding semiconductor device.

Figure 6:
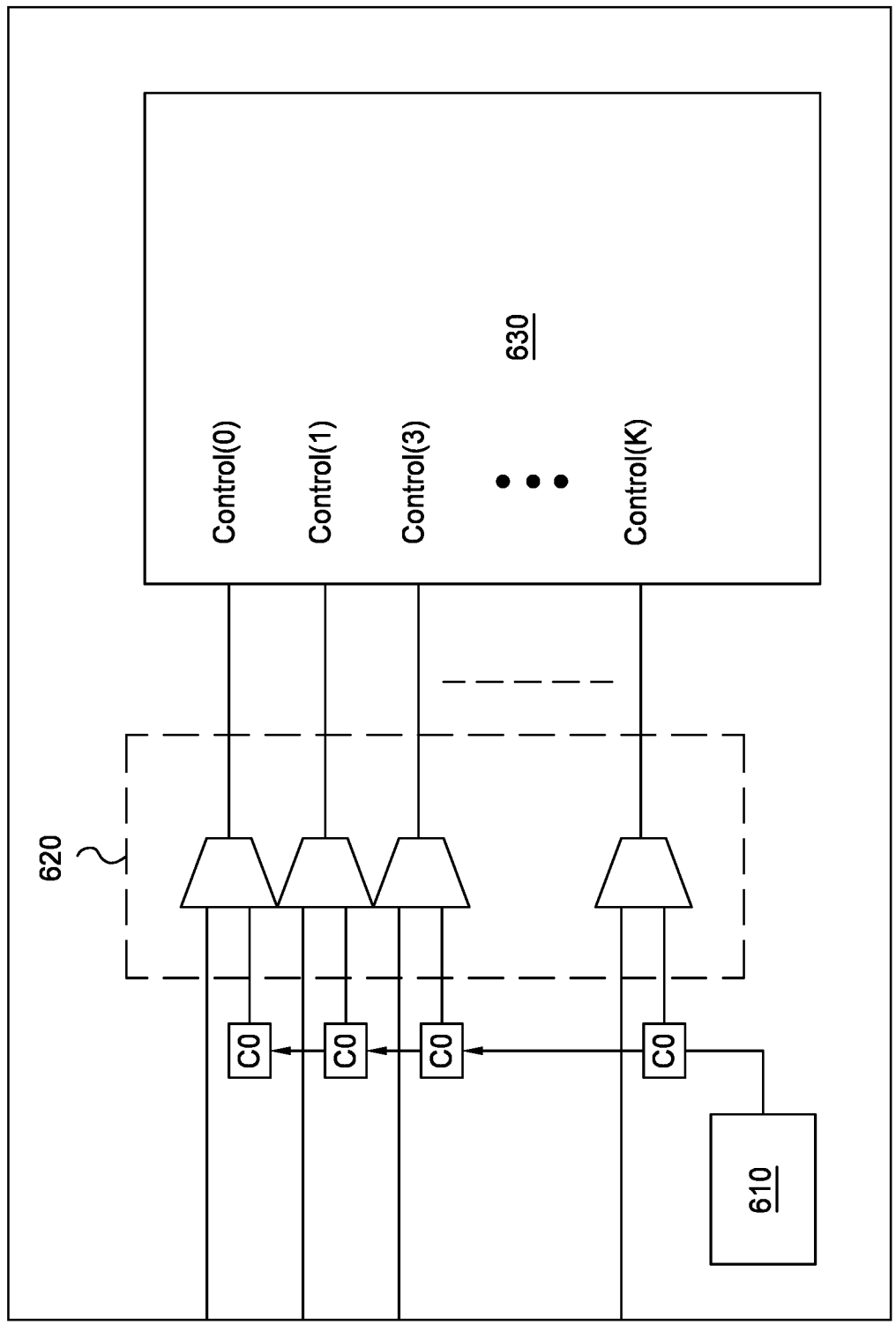
FIG. 6 is a block diagram depicting a portion of an example semiconductor device according to some examples.

FIG. 6 illustrates a portion of a semiconductor device 600, according to one or more embodiments. The semiconductor device 600 is configured similar to that of the semiconductor device 100. However, as compared to the semiconductor device 100 that utilizes shift register circuitry 410 to load control data into the DUT, e.g., DUT 130, in FIG. 6, the semiconductor device 600 includes control memory 610 that loads control data into the inputs of the DUT 630 via MUXs 620. The control memory 610 receives data from the testing interface 140 or another external computing device.

Figure 7:
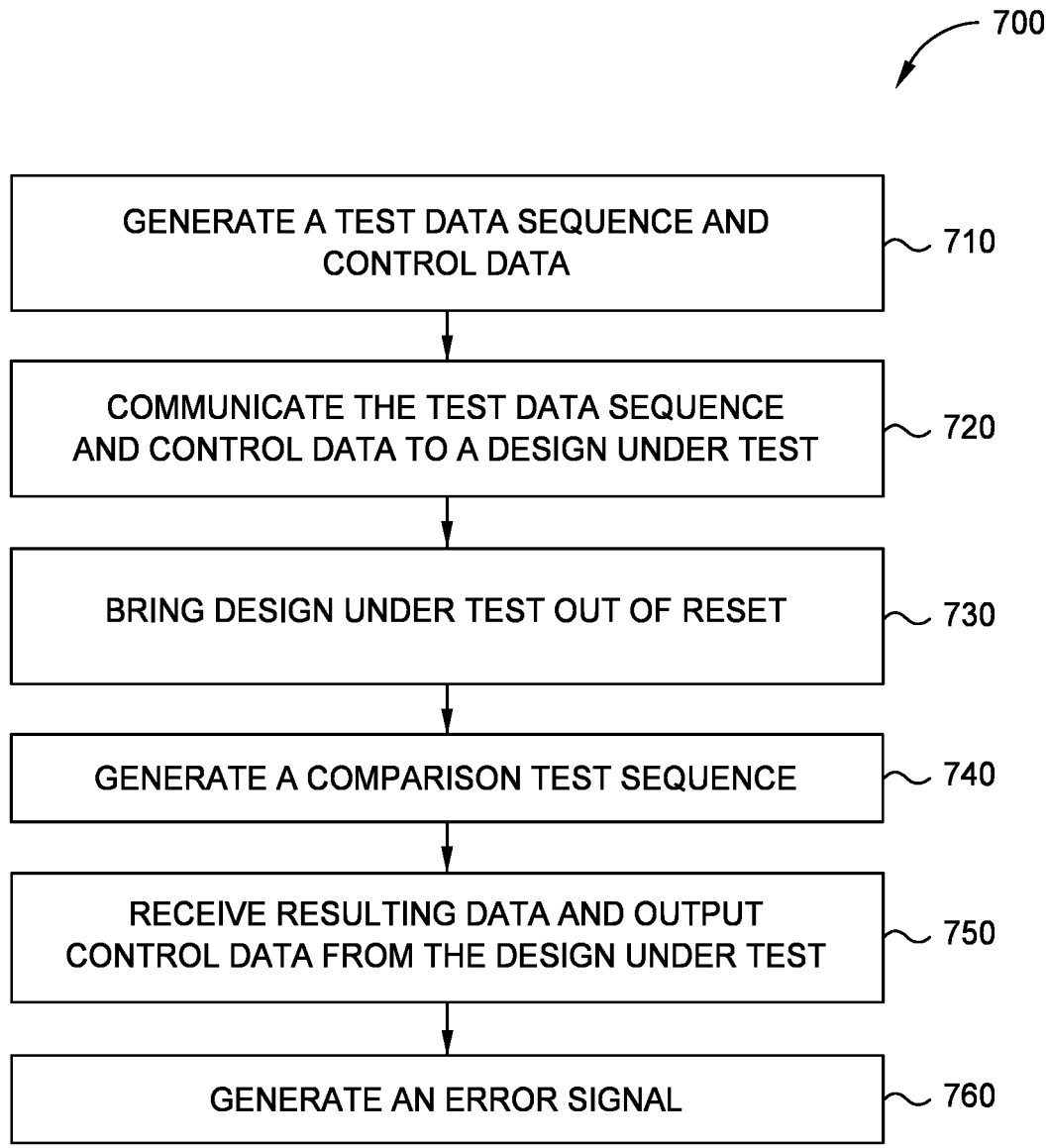
FIG. 7 is a flow chart illustrating a method of testing a semiconductor device according to some examples.

FIG. 7 illustrates a flow chart of a method 700 for testing a semiconductor device, according to one or more embodiments. At operation 710, a test data sequence and control data is generated. For example, the test data generation circuitry 112 of the pattern generation circuitry 110 generates the test data sequence based configuration data received from the testing interface 140. Further, the control data generation circuitry 114 of the pattern generation circuitry 110 generates control data based on the configuration data received from the testing interface 140. The configuration data includes a configuration pattern. Further, the configuration data my include control data such as clock signals and/or initialization signals.

At operation 720, the test data sequence and the control data is communicated to the DUT. For example, the test data generation circuitry 112 of the pattern generation circuitry 110 communicates the test data sequence to the DUT 130. Further, the control data generation circuitry 114 of the pattern generation circuitry 110 communicates the control data to the DUT 130. The control data generation circuitry 114 includes the shift register circuitry 410 that is configured to use a plurality of shifts to communicate configuration data stored within the configuration memory 116 to the DUT 130.

At operation 730, the DUT is brought of reset. For example, the testing interface 140 brings the DUT 130 out of reset. The testing interface brings one or more of the memory elements and/or circuit elements out of reset. The reset memory elements and/or circuit elements are placed at a known state. The known state is provided by the testing interface 140. The testing interface 140 outputs a control signal to the DUT 130 to bring the DUT 130 out of reset. In one example, the testing interface 140 outputs a reset signal to the DUT 130 to reset the DUT 130. The DUT 130 outputs a reset done signal when the DUT 130 has been reset.

At operation 740, a comparison test sequence is generated. The comparison test sequence is generated by the sequence checker circuitry 122 of the pattern checker circuitry 120 based on configuration data provided by the testing interface 140. The comparison test sequence corresponds to the test data sequence. For example, the comparison test sequence may be a delayed version of the test data sequence. The delay may correspond to the delay of the DUT 130.

At operation 750, resulting data and output control data is received from the DUT. The resulting data is received by the sequence checker circuitry 122 of the pattern checker circuitry 120. The control data is received by the control data checker circuitry 124 of the pattern checker circuitry 120. In one example, the control data is received by the buffer 430 of the control data checker circuitry 124.

At operation 760, an error signal is generated. The error signal is generated based on a comparison of the comparison test sequence and the resulting test data and a comparison of the control data and the output control data. The sequence checker circuitry 122 compares the comparison test sequence and the resulting test data to determine if errors exist in the resulting test data. For example, one or more errors are detected when the comparison test sequence does not match the resulting test data. The sequence checker circuitry 122 generates the error signal 123 that is indicative of whether or not errors were detected within the resulting test data.

The control data checker circuitry 124 compares the output control data to a configuration pattern within the configuration memory 126 to determine if errors exist within the output control data. For example, one or more errors are detected when the output test data does not match the configuration pattern. The control data checker circuitry 124 generates the error signal 125 that is indicative of whether or not errors were detected within the resulting test data. The comparison circuitry 128 generates the error signal 129 based on the error signal 123 and 125. The error signal 129 is indicative of errors within the error signal 123 or 125. When the error signals 123 and 125 are free from errors, the error signal 129 provides an indication no errors were detected. When the error signal 123 and/or the error signal 125 includes one or more errors, the error signal 129 provides an indication that errors were detected.

The error signal 129 is communicated to TSR 146 and to the testing interface 140. The testing interface 140 communicates the error signal 129, or a signal based on the error signal 129, to the testing device 180 for further processing.

Figure 8:
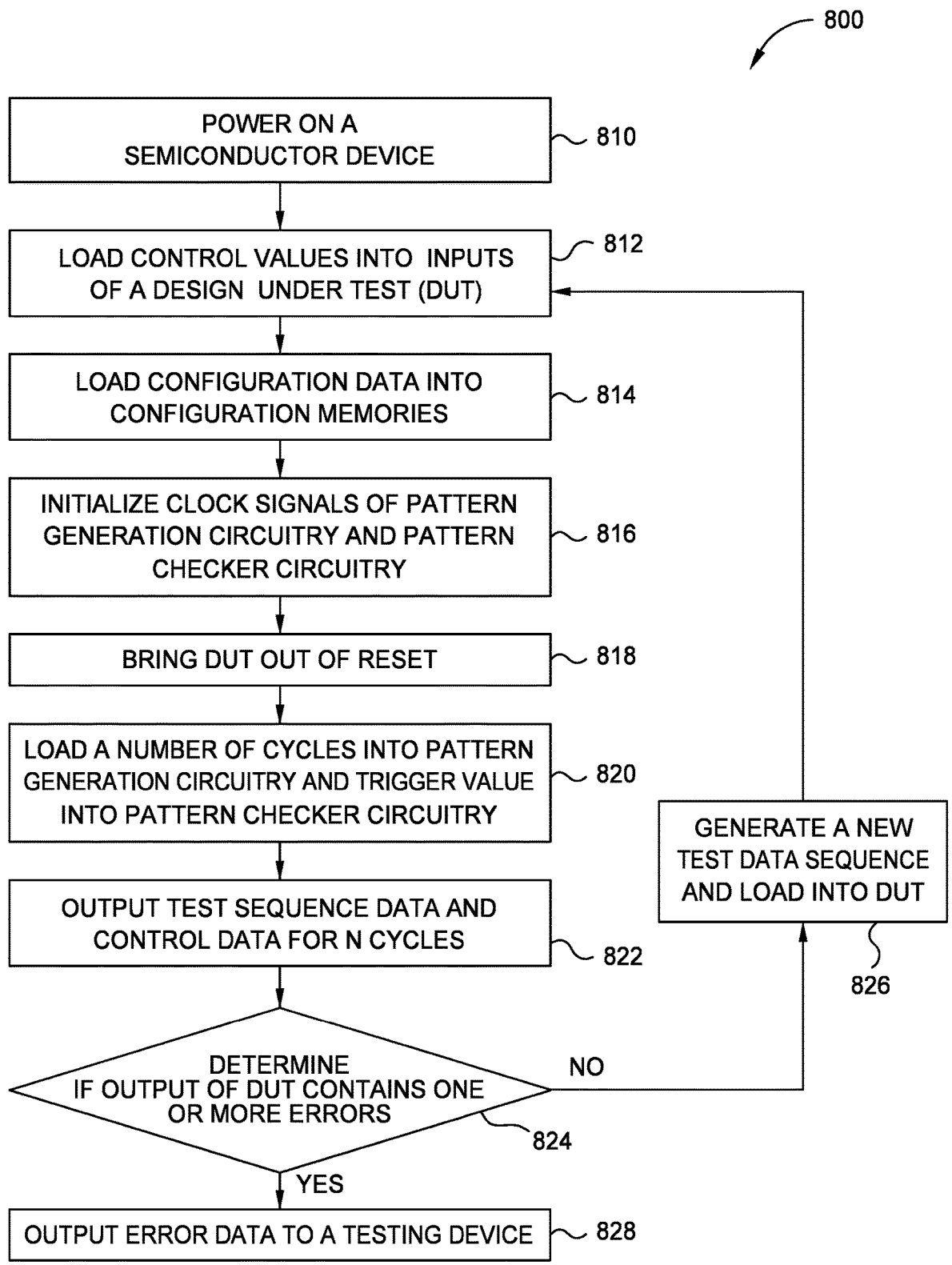
FIG. 8 is a flow chart illustrating a method of testing a semiconductor device according to some examples.

FIG. 8 illustrates a flow chart of a method 800 for testing a semiconductor device, according to one or more embodiments. At operation 810, a semiconductor device is powered on. For example, the semiconductor device 100 is powered on at operation 810. At operation 812, control values are loaded into the control inputs of the DUT. For example, the pattern generation circuitry 110 loads control data into the control inputs of the DUT 130. In one example, the control data generation circuitry 114 loads the control data into the control inputs of the DUT 130. Alternatively, the control memory 610 loads control data into the control inputs of the DUT 630 via the MUXs 620.

At operation 814, configuration data is loaded into the pattern generation circuitry and pattern checker circuitry.

For example, at operation 814, configuration data is loaded into the pattern generation circuitry 110 and the pattern checker circuitry 120 by the testing interface 140. In one example, the configuration data is loaded into the configuration memory 116 and the configuration memory 126 by the testing interface 140.

At operation 816, the clock signals of the pattern generation circuitry and the pattern checker circuitry are initialized. For example, the clock signal/signals of the pattern generation circuitry 110 is/are initialized by clock control circuitry of the pattern generation circuitry 110. The clock control circuitry is phase locked-loop (PLL) of the pattern generation circuitry 110. In one example, the clock control circuitry initializes the clock signal/signals based on a clock signal or other control signal received from the testing interface 140. Further, at operation 816, the clock signal/signals of the pattern generation circuitry 110 is/are initialized by clock control circuitry of the pattern checker circuitry 120. The clock control circuitry is a PLL of the pattern checker circuitry 120. In one example, the clock control circuitry initializes the clock signal/signals based on a clock signal or other control signal received from the testing interface 140.

At operation 818, the DUT is brought of reset by the testing interface. For example, the testing interface 140 brings the DUT 130 out of reset. The testing interface brings one or more of the memory elements and/or circuit elements out of reset. The reset memory elements and/or circuit elements are placed at a known state. The known state is provided by the testing interface 140. The testing interface 140 outputs a control signal to the DUT 130 to bring the DUT 130 out of reset. In one example, the testing interface 140 outputs a reset signal to the DUT 130 to reset the DUT 130. The DUT 130 outputs a reset done signal when the DUT 130 has been reset.

At operation 820, load the pattern generation circuitry 110 with the number of cycles and load the pattern checker circuitry 120 with the trigger value. The operation 820 may occur after receiving an indication that the DUT has been reset. For example, the reset status of the DUT is read from the control outputs of the DUT. When the control outputs of the DUT are indicative of the DUT being reset, the pattern generation circuitry 110 is loaded with N number of cycles and the pattern checker circuitry is 120 is loaded with the trigger value of N.

At operation 822, test sequence data and control data is output by the pattern generation circuitry 110 for N cycles. The N cycles correspond to N cycles of a clock signal. The clock signal is a clock signal of the pattern generation circuitry 110. For example, the pattern generation circuitry 110 outputs the test sequence data and the control data to the DUT 130 for N cycles. The control data generation circuitry 114 outputs the test control data 420 and the test data generation circuitry 112 outputs the test data sequence for N cycles.

At operation 824, a determination as to whether or not the output signals of the DUT contain errors. For example, the pattern checker circuitry 120 determines whether or not errors exist within the output signals provided by the DUT 130. The control data checker circuitry 124 determines if the output control data of the DUT 130 has any errors and the sequence checker circuitry 122 determines if the resultant test sequence data has any errors. The pattern checker circuitry 120 outputs a signal indicative if either of the sequence checker circuitry 122 or the control data checker circuitry 124 determined if errors existed within the corresponding outputs of the DUT 130.

If no errors are detected at operation 824, a new test data sequence is generated and provided to the DUT at operation 826. For example, the pattern generation circuitry 110 generates a new (second) test data sequence and provides (e.g., transmits or loads) the new test data sequence into the DUT 130. After operation 826, the method 800 proceeds to the operation 812.

If errors are detected at operation 824, the error data is output to a testing device. For example, the error data is output to the testing device 180 via the testing interface 140. The testing device 180 processes the error data to determine mismatched bit/bits and cycle location/locations. The mismatched bits or bits and corresponding location or locations are used to debug the DUT 130.

In one example, a testing device is utilized to detect errors within semiconductor devices for debugging. For example, the testing interface communicates control data and/or configuration data to the sequence generation circuitry and sequence checker circuitry. The sequence generation circuitry generates test control data and test sequence data from the control data and/or configuration data. The test control data and test sequence data is transmitted to a design under test (DUT) of a semiconductor device. The sequence checker circuitry receives output data from the DUT and compares the output data to a comparison sequence data and output control data to determine if errors exist within the DUT. The sequence checker circuitry generates the comparison sequence data from configuration data provided by the testing interface.

While the foregoing is directed to specific examples, other and further examples may be devised without departing from the basic scope thereof, and the scope thereof is determined by the claims that follow.

What is claimed is:

1. A semiconductor device comprises:
   a design under test (DUT);
   a testing interface;
   pattern generation circuitry connected to the DUT and the testing interface, the pattern generation circuitry is configured to:
      generate a test data sequence and control data based on configuration data received from the testing interface; and
      communicate the test data sequence and the control data to the DUT; and
   pattern checker circuitry connected to the DUT and the testing interface, the pattern checker circuitry is configured to:
      generate a comparison test sequence based on the configuration data received from the testing interface;
      receive resultant test data sequence and output control data from the DUT; and
      generate a first error signal based on a comparison of the resultant test data sequence and the comparison test sequence and a comparison of the output control data and the configuration data.

2. The semiconductor device of claim 1, wherein the test data sequence is one of a binary sequence and a pseudorandom number and comprises first cycles, and wherein the control data is communicated to the DUT during a period corresponding to the first cycles.

3. The semiconductor device of claim 1, wherein the pattern generation circuitry comprises:
   test data sequence generation circuitry configured to generate the test data sequence;

a first configuration memory configured to receive the configuration data from the testing interface and store the configuration data; and control data generation circuitry configured to generate the control data based on the configuration data stored within the first configuration memory.

4. The semiconductor device of claim 3, wherein the control data generation circuitry comprises a shift register circuitry comprising a plurality of flip flops.

5. The semiconductor device of claim 4, wherein the plurality of flip flops are disposed in first rows and first columns, wherein a number of the first columns corresponds to a number of cycles of the test data sequence.

6. The semiconductor device of claim 1, wherein the pattern checker circuitry comprises:

sequence checker circuitry configured to generate the comparison test sequence and receive the resultant test data sequence from the DUT;

control data checker circuitry configured to receive the output control data from the DUT; and a second configuration memory configured to receive the configuration data from the testing interface and store the configuration data.

7. The semiconductor device of claim 6, wherein the sequence checker circuitry is further configured to generate a second error signal based on a comparison between the comparison test sequence and the resultant test data sequence, and the control data checker circuitry is further configured to generate a third error signal based on a comparison between the configuration data and the output control data, and wherein the first error signal is based on the second error signal and the third error signal.

8. The semiconductor device of claim 6, wherein the comparison test sequence is a delayed version of the test data sequence.

9. The semiconductor device of claim 6, wherein the sequence checker circuitry is configured to:

compare the comparison test sequence to the resultant test data sequence; and output a second error signal based on the comparison of the comparison test sequence to the resultant test data sequence.

10. The semiconductor device of claim 9, wherein the control data checker circuitry comprises:

a buffer configured receive the output control data from the DUT; and error identification circuitry configured to:
compare the output control data to the configuration data; and
output a third error signal based on the comparison of the output control data and the configuration data.

11. The semiconductor device of claim 10, wherein the buffer comprises a second plurality flip flops disposed in second rows and second columns, wherein a number of second columns is equal to a number of cycles of the test data sequence.

12. The semiconductor device of claim 1, wherein the testing interface is connected to a testing device configured to detect one or more errors within the DUT based on the first error signal, the testing device is external to the semiconductor device.

13. A method for testing a semiconductor device;

generating, by pattern generation circuitry, a test data sequence and control data based on configuration data provided by a testing interface;

communicating the test data sequence and the control data to a design under test (DUT);

generating, by pattern checker circuitry, a comparison test sequence based on the configuration data provided by the testing interface;

receiving a resultant test data sequence and output control data from the DUT; and generating, by the pattern checker circuitry, a first error signal based on a comparison of the resultant test data sequence and the comparison test sequence and a comparison of the output control data to the configuration data.

14. The method of claim 13, the test data sequence is one of a binary sequence and a pseudorandom number and comprises first cycles, and wherein the control data is communicated to the DUT during a period corresponding to the first cycles.

15. The method of claim 13, wherein generating, by the pattern generation circuitry, the test data sequence and the control data based on the configuration data comprises:

generating, by test data sequence generation circuitry of the pattern generation circuitry, the test data sequence;

storing, by a first configuration memory of the pattern generation circuitry, the configuration data; and generating, by control data generation circuitry of the pattern generation circuitry, the control data based on the configuration data stored within the first configuration memory.

16. The method of claim 15, wherein the control data generation circuitry comprises shift register circuitry, wherein generating, by the control data generation circuitry, the control data comprises shifting the configuration data through the shift register circuitry.

17. The method of claim 16, wherein the shift register circuitry is configured to shift the configuration data a number of shifts corresponding to a number of cycles of the test data sequence.

18. The method of claim 13, wherein the pattern checker circuitry comprises sequence checker circuitry, control data checker circuitry, and a second configuration memory, and wherein generating the first error signal comprises:

generating, by the sequence checker circuitry, a second error signal based on a comparison between the comparison test sequence and the resultant test data sequence; and generating, by the control data checker circuitry, a third error signal based on a comparison between the configuration data and the output control data, and wherein the first error signal is based on the second error signal and the third error signal.

19. The method of claim 13, further comprising detecting one or more errors within the DUT based on the first error signal.

20. A testing system comprising:
a semiconductor device comprising:
a design under test (DUT);
a testing interface configured to connect to a testing device;
pattern generation circuitry connected to the DUT and the testing interface, the pattern generation circuitry is configured to:
generate a test data sequence and control data based on configuration data received from the testing interface; and
communicate the test data sequence and the control data to the DUT; and
pattern checker circuitry connected to the DUT and the testing interface, the pattern checker circuitry is configured to:

generate a comparison test sequence based on the configuration data received from the testing interface;

receive resultant test data sequence and output control data from the DUT; and generate an error signal based on a comparison of the resultant test data sequence and the comparison test sequence and a comparison of the output control data and the configuration data, wherein the testing interface is configured to communicate the error signal to the testing device, and the testing device is configured to detect one or more errors within the DUT based on the error signal.

\* \* \* \* \*